United States Patent [19]
Mercadie et al.

[11] 3,759,381
[45] Sept. 18, 1973

[54] SORTING APPARATUS

[75] Inventors: Clarke Mercadié, Eragny; Pierre Taussac, La Celle St. Cloud, both of France

[73] Assignee: Societe Anonyme dite: Systems et Procedes Industriels Modernes, St.-Germain-en-Laye, France

[22] Filed: Apr. 26, 1972

[21] Appl. No.: 247,663

[52] U.S. Cl................. 209/73, 209/74, 209/125, 214/11 R
[51] Int. Cl. .............................................. B07c 7/00
[58] Field of Search .............. 214/11 R, 11 A; 209/74 R, 74 M, 73, 125

[56] References Cited
UNITED STATES PATENTS

| | | | |
|---|---|---|---|
| 2,936,556 | 5/1960 | Gibson | 214/11 A |
| 3,086,636 | 4/1963 | Raynor | 214/11 R |
| 3,252,595 | 5/1966 | Collins et al. | 214/11 R |
| 3,406,843 | 10/1968 | Lasbrey et al. | 214/11 R |

*Primary Examiner*—Allen N. Knowles
*Attorney*—Leo A. Rosetta et al.

[57] ABSTRACT

A sorting apparatus having two superposed conveyors with each of which are associated a loading station, an indexing station and a plurality of receiving stations, each conveyor having a plurality of receptacles and a control memory being provided to initiate unloading of a carrier at the receiving station with which the carrier has been associated at the moment of indexing.

16 Claims, 9 Drawing Figures

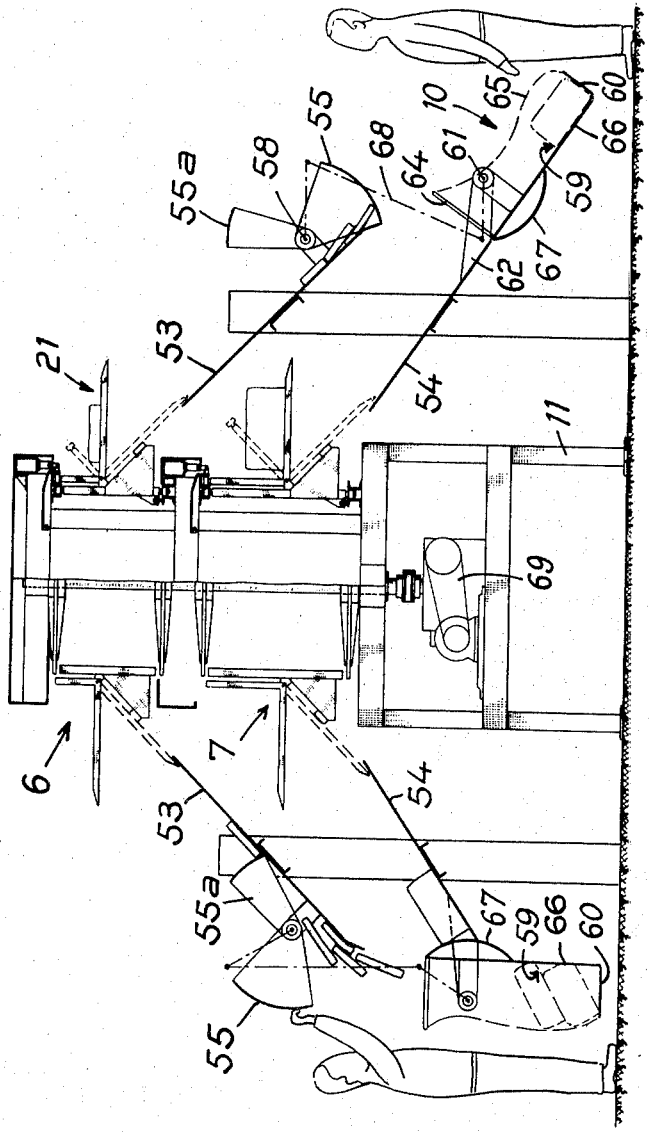

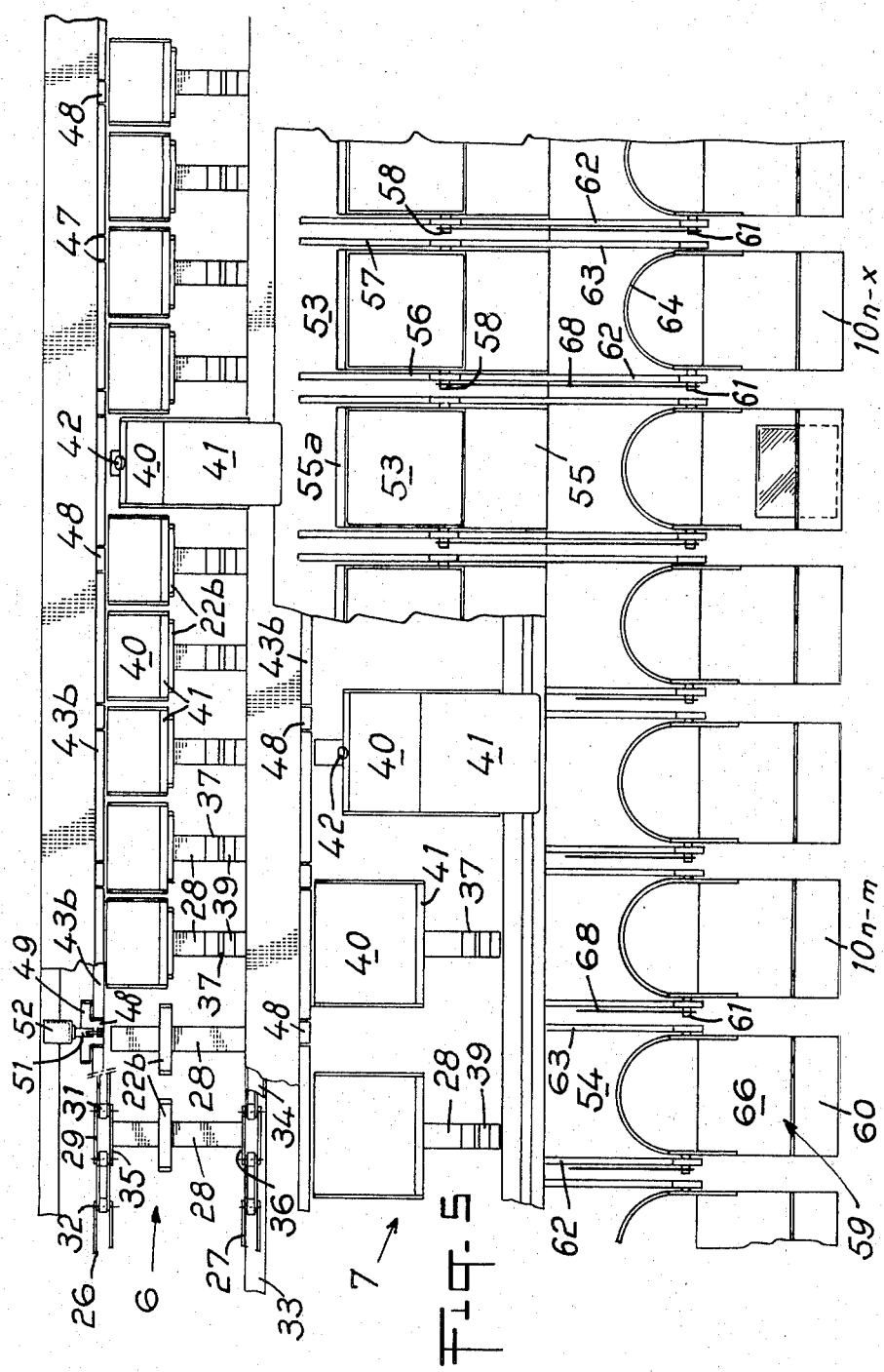

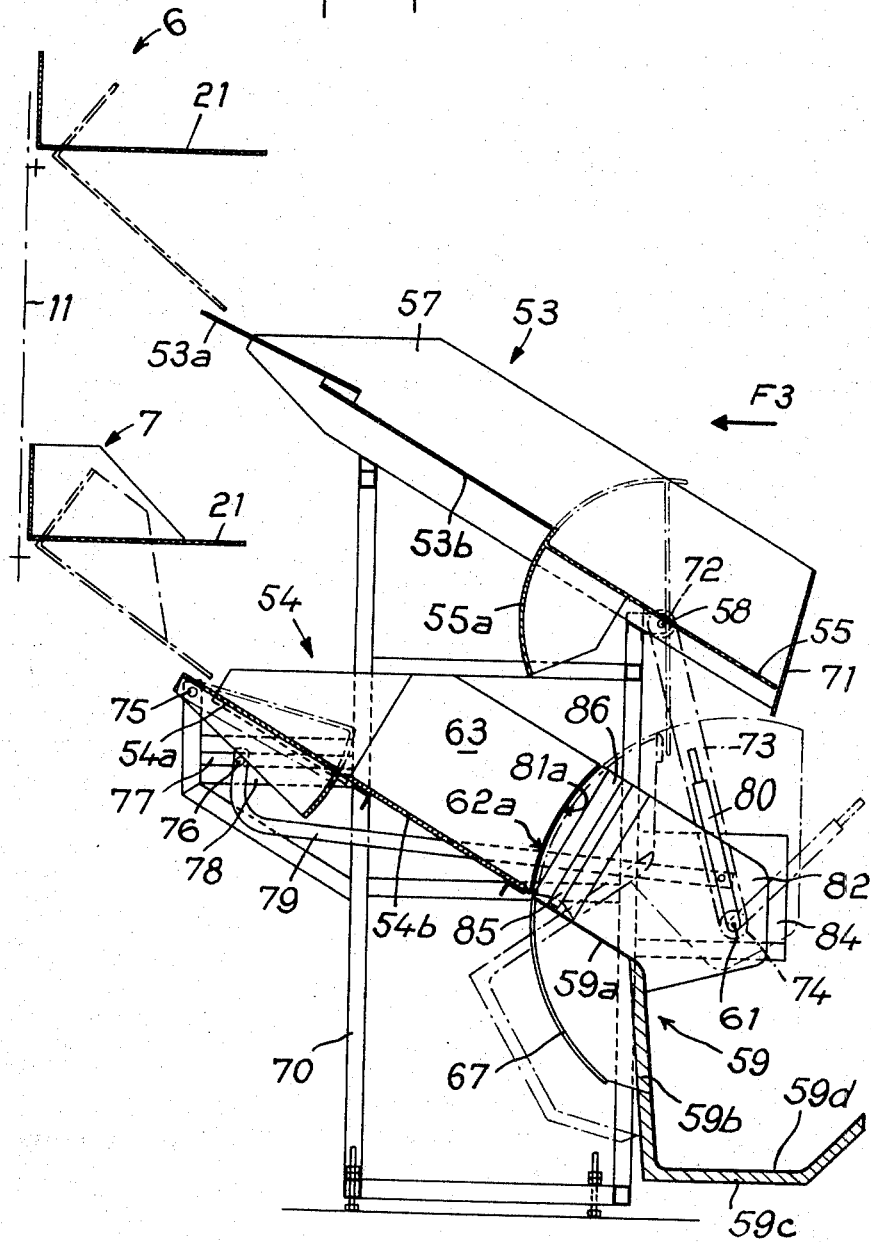

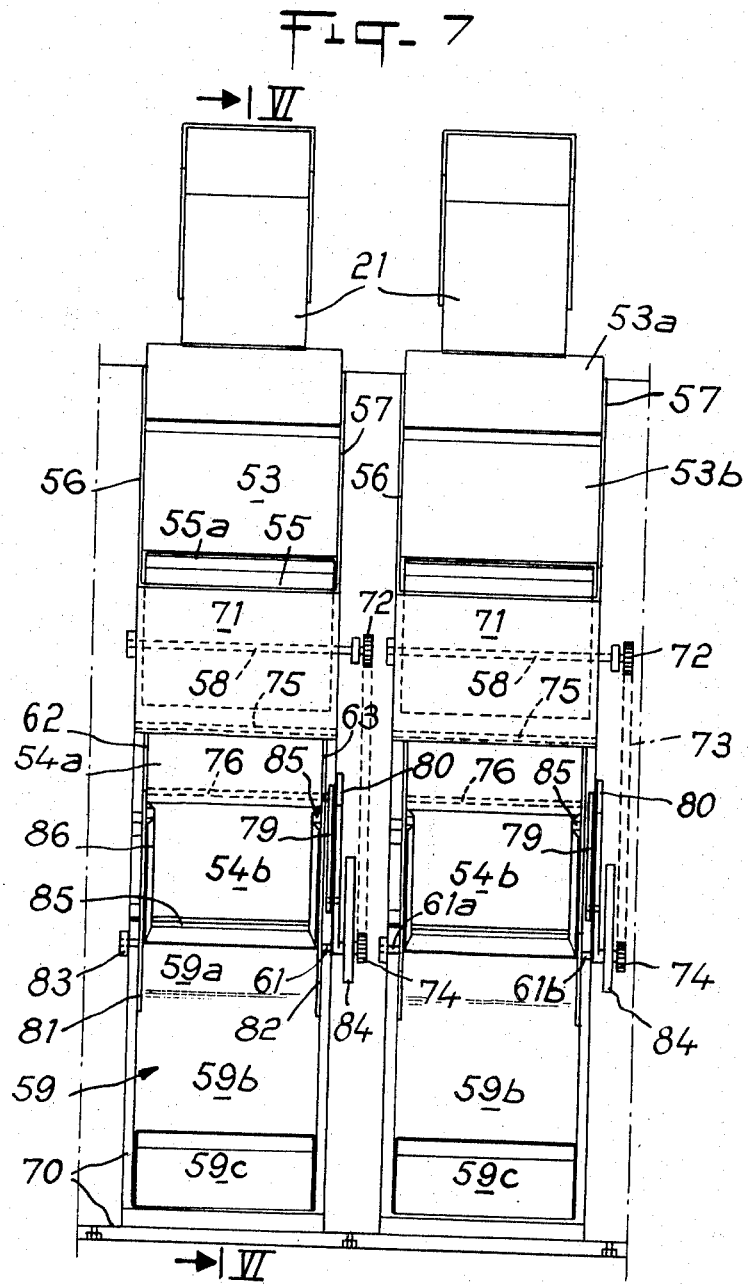

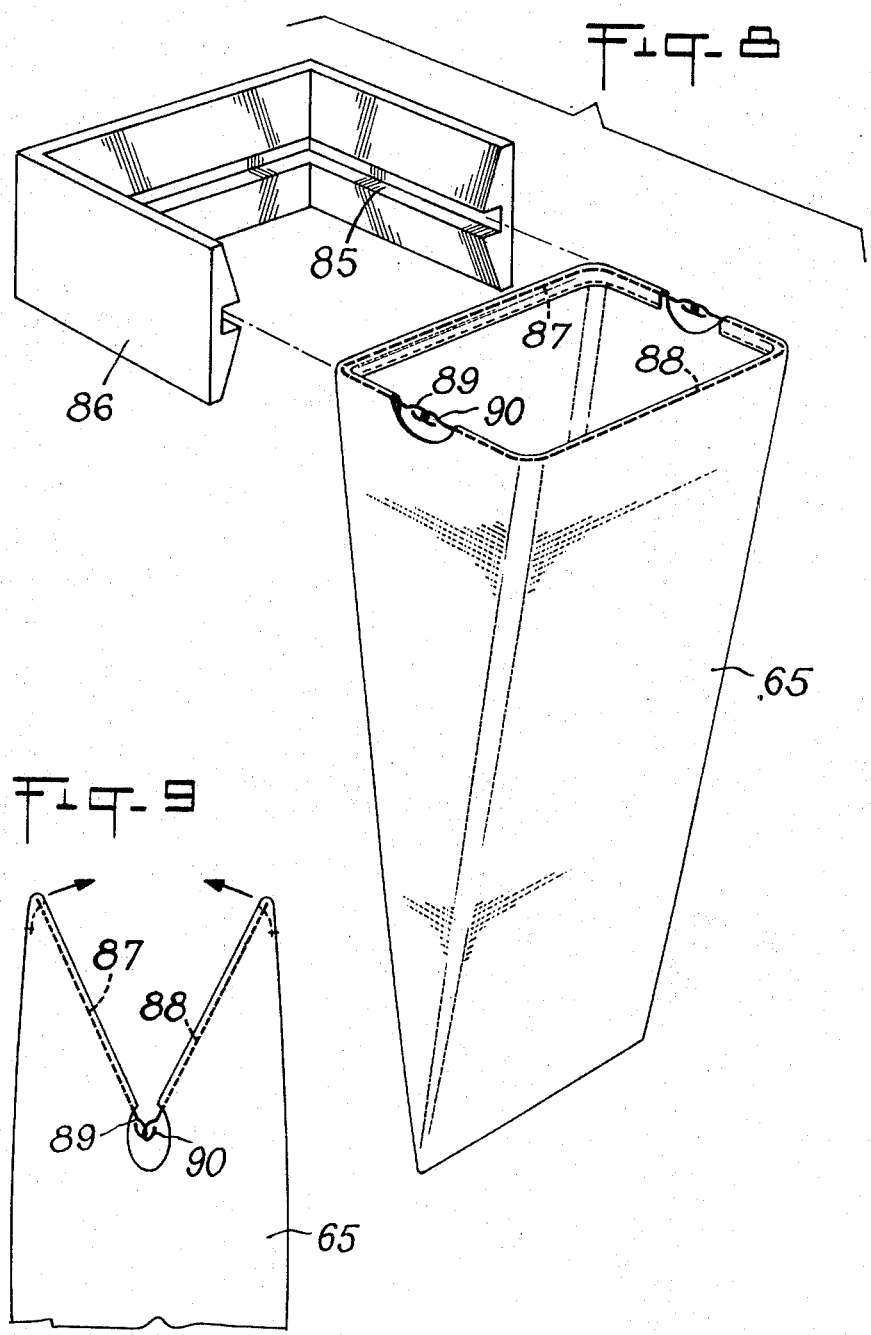

SORTING APPARATUS

The present invention is concerned with apparatus for distributing articles to a plurality of receiving stations, the apparatus comprising a loading station, an endless conveyor which extends past the loading station as well as all the receiving stations, and having a plurality of carriers which can be loaded with articles to be taken to the different receiving stations, and an indexing station associated with the different carriers and comprising a control memory for initiating discharge of a carrier in the region of a receiving station which has been associated with the carrier at the moment of indexing.

Apparatus of this type does not allow separation of large and small parcels so that, at the receiving station which is to receive successively parcels of different size but belonging to the same group, these parcels fall pell-mell into a receptacle, for example a sack. Thus frequently large parcels fall on small parcels which are generally more fragile than the large parcels and the large parcels damage or destroy the small parcels. Taken in general it is the large parcels which are of greater weight. The damage suffered by the small parcels is not generally discovered until arrival at the destination when the addressee claims replacement of the damaged merchandise. Thus known apparatus is not wholly satisfactory to the users such as the mail-order houses and stock rooms of multiple stores.

It is an object of the present invention to overcome these difficulties and to provide apparatus of the above-mentioned kind allowing pre-selection of small parcels and of large parcels in at least two groups of size or weight, to selectively separate, as a function of their size or weight, the parcels on predetermined receiving stations and to sack-up a group of parcels so that the larger or heavier parcels are placed in the sack or receptacle before the small or lighter parcels.

An apparatus of the above-mentioned kind according to the invention comprises at least another endless conveyor located above the first and provided with a plurality of carriers for receiving articles or parcels of a group of a size different from the size of the articles moved by the first conveyor, a loading station, an indexing station and a control memory, all associated with this other conveyor and positioned at a different level from that of the analogous stations associated with the first conveyor, and an intermediate receiver located between each receiving station associated with at least two conveyors and between the first conveyor and the other conveyor.

This apparatus will direct articles to the receiving stations so that the articles or parcels of large size are received at the predetermined receiving station before the articles or parcels of small size.

Other characteristics and advantages of the invention will appear from the following description of two embodiments according to the invention, given by way of examples only, in which description reference will be made to the accompanying drawings in which:

FIG. 4 shows schematically, on a smaller scale, several operating conditions in vertical section on the line III — III of FIG. 1 of an embodiment of receiving stations associated each with carriers of two superposed conveyors;

FIG. 5 shows a side elevation of part of the apparatus, partially broken away, taken in the direction of arrow $F_2$ of FIG. 1;

FIG. 6 shows a receiving station in elevation in the direction of arrows VI — VI of FIGS. 1 and 7;

FIG. 7 is a side elevation in the direction of arrow $F_3$ of FIG. 6, and

FIGS. 8 and 9 show details of the sack and of a receiving station according to FIGS. 6 and 7.

Figure 1:
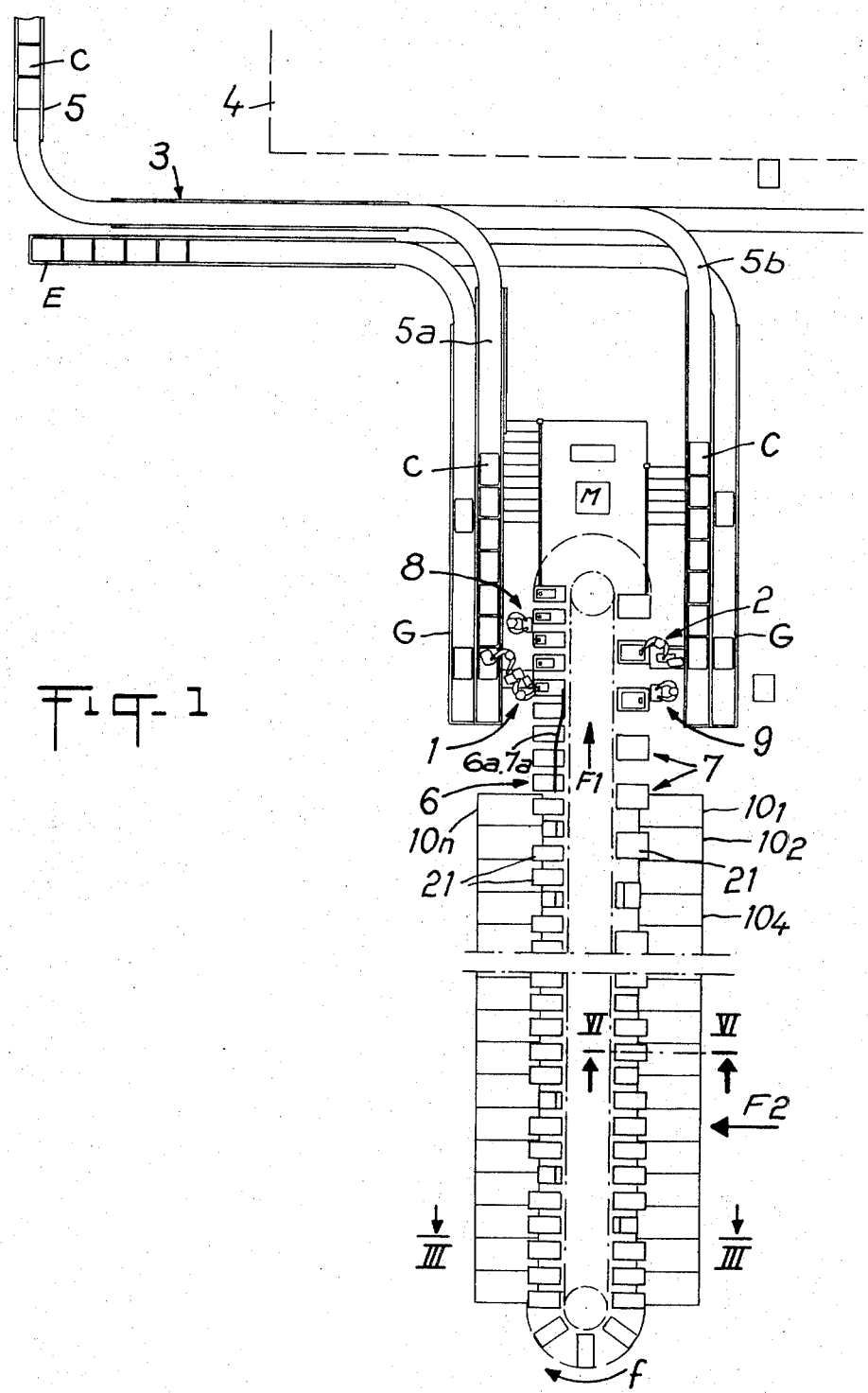
FIG. 1 represents a plan view of the apparatus.

As can be seen in FIG. 1, the sorting apparatus comprises at least two loading stations 1, 2, each coupled downstream of the exit of a preselection station 3 which is fed with articles or parcels from a main store 4 by means of an endless conveyor 5.

This preselection station 3 can, for example, comprise a hinged trap (not shown) which opens upon an object arriving there and being of a weight exceeding a predetermined limiting weight. This hinged trap is located in the path of objects between a common entry and two exits of the preselection station, exits each of which is coupled by a conveyor 5a, 5b, either to the upper loading station 1 or to the lower loading station 2.

It is equally possible to preselect parcels according to their size in the store 4 where these parcels are, in general, already regrouped according to size; in this case, the parcels of a like size group are placed in troughs or chests C which, by means of a conveyor such as 5 and the conveyor bands 5a, 5b are brought to the corresponding loading station 1 or 2.

Parallel with the last section 5a, 5b of the conveyor 5 is located a return slide G which, at least at its upper extremity is at the same level as the corresponding conveyor band 5a, 5b, so that the troughs C, when emptied of their contents, can be returned toward the recovery station E.

Past each loading station 1, 2, extends an endless conveyor 6, 7. For greater clarity, part of the upper conveyor 6 has been omitted from FIG. 1 so as to make visible in that figure a part of the lower conveyor 7.

In the region of each loading station 1, 2 and downstream of the latter, in the direction of travel of the conveyors 6, 7 shown by the arrow $f$, is an indexing station 8 or 9 at which the destination or address of the object on a carrier 21 of the corresponding conveyor 6 or 7 positioned at the indexing post 8 or 9 is memorized. In FIG. 1, a memory M has been shown schematically, this memory initiating tipping of a predetermined carrier 21 at a preselected receiving station. The concept of this known memory M will be briefly described below.

It is particularly advantageous to provide the loading stations and indexing stations near one of the ends of the conveyors 6, 7. In this case, it is preferable to position the stations 1 and 8 associated with the upper conveyor 6 on one side of the end of the conveyor and the stations 2 and 9 associated with the lower conveyor 7 at the other side of the end of the conveyor.

On the paths of the conveyors 6, 7, between the indexing stations 8 and 9 and the loading stations 1 and 2 and extending to the other extremity of the conveyors 6, 7 are, at a lower level than conveyors 6, 7 and displaced laterally outwardly relative to the conveyors, a number of juxtaposed receiving stations $10_1$, $10_2$ ......... to $10_n$ which can be fed by each of the conveyors 6, 7. Upstream of the loading stations 1 and 2, taken in the direction of travel $f$ of the conveyors 6, 7 there is a ramp $6a$ or $7a$ associated with the corresponding conveyor and these ramps serve to reposition to their receiving attitude the hinged carriers 21, this ramp $6a$, $7a$ being fixed to a base 11 of the conveyors 6, 7.

Figure 2:
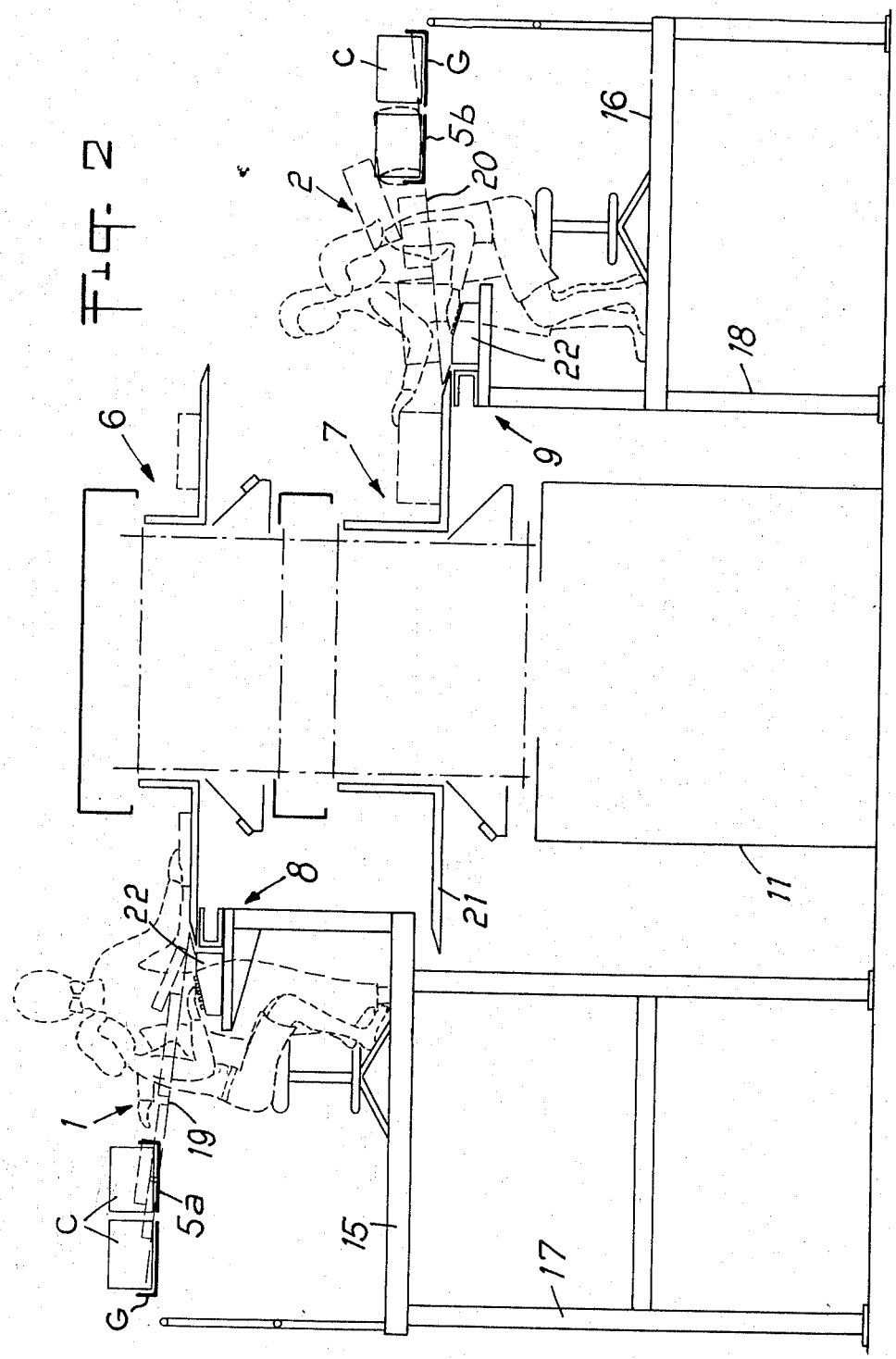
FIG. 2 is a front elevation, on an enlarged scale, of the loading station and indexing station for two superposed conveyors, the view being taken in a direction of arrow $F_1$ in FIG. 1.
Figure 3:
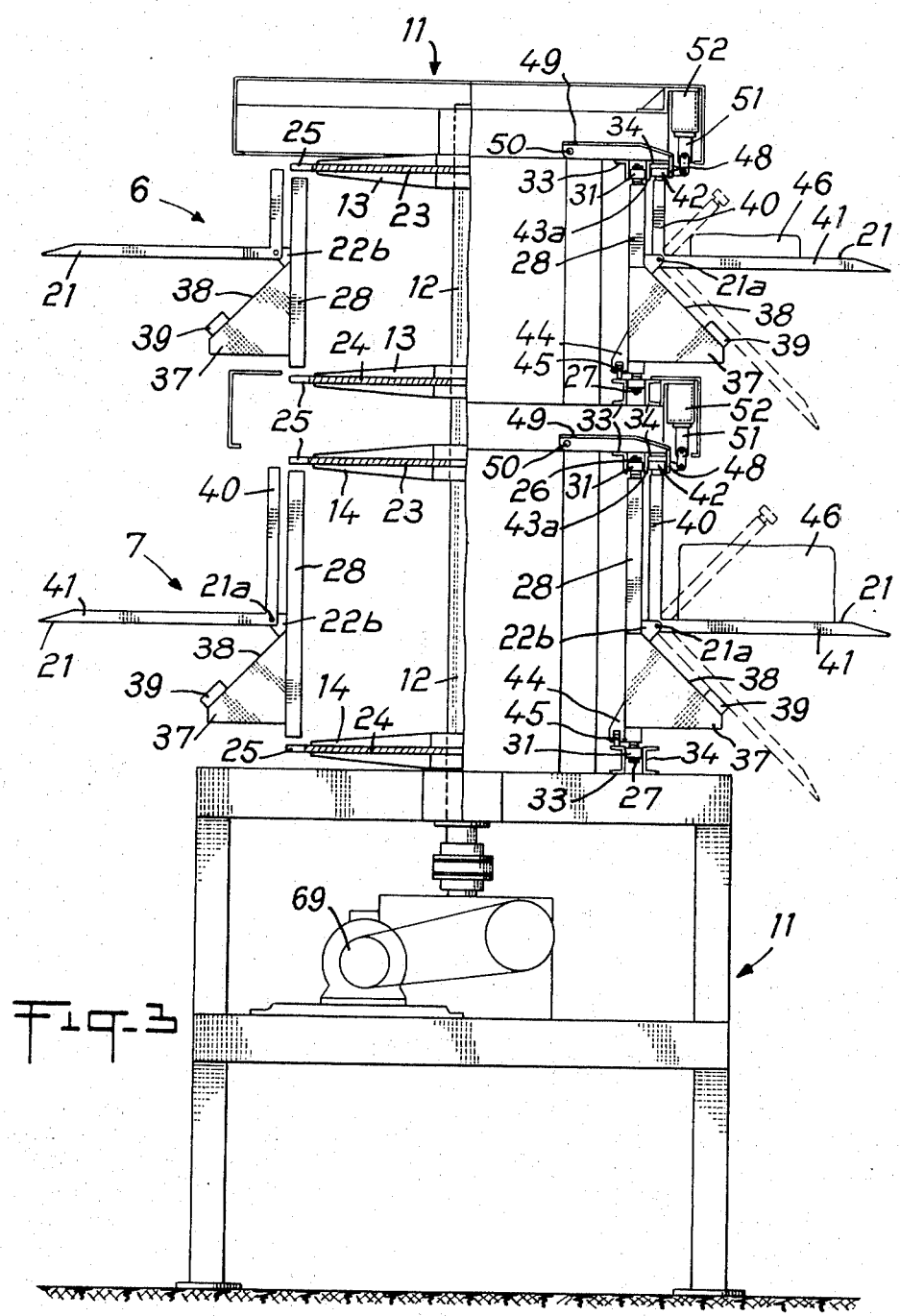
FIG. 3 is a vertical section of the apparatus along the line III — III of FIG. 1, the receiving stations not being shown.

As can be seen particularly in FIGS. 2 and 3, the apparatus comprises a base 11 which, at each of the ends of the conveyors 6 and 7, supports through a vertical shaft 12 two drive assemblies 13, 14 which are superposed and associated each with one of the conveyors 6 and 7. Near one extremity of the base 11 are provided on each side of the base a loading station 1 or 2 and an indexing station 8 or 9.

The loading stations and indexing stations 1 and 8 or 2 and 9, associated with the upper conveyor 6 or lower conveyor 7 are situated on a common work platform 15 or 16 mounted on an appropriate frame 17 or 18.

Each loading station 1 and 2 comprises a loading slide 19, 20 inclined downwardly toward the corresponding conveyor 6 or 7 and having its free end slightly overlapping the free end of the carriers 21 of the conveyor 6 or 7 when they come in front of the slide 19 or 20. The slide is fed by a conveyor extending from the preselection station or store.

The indexing station 8 or 9 comprises a control desk 22 which is coupled to the memory M, for example of an electro-mechanical type. The memory M comprises, for example, a plurality of elements magnetisable by a head controlled from the desk 22. These elements are in number equal to the number of carriers 21 of a conveyor 6 or 7 and are incorporated in a miniature conveyor which moves at a speed proportional to that of the conveyor 6 or 7. In the path of the miniature conveyor are located reading heads in number equal to the number of receiving stations $10_1$ to $10_n$. These reading heads can only read their own address, which corresponds to a predetermined receiving station. When a reading head detects on a magnetized element appearing before it information which corresponds to its own address, it initiates hinging of the corresponding carrier at a receiving station to which the reading head corresponds.

As can be more clearly seen in FIGS. 3 and 5, each of the conveyors 1 and 2 comprises at each end a pair of superposed toothed wheels 23, 24 which constitute, either the drive assembly or the idle assembly of the conveyor. The toothed wheels 23, 24 of a pair of toothed wheels are keyed on the corresponding shaft 12, so that the teeth roots 25 of one of the wheels are in register with those of the other. Each conveyor 6, 7 comprises a pair of pin or roller chains 26, 27. The chain 26 of a pair of chains is coupled to the other chain 27 by vertical transverse bars 28 secured, for example, on a shaped element fast with a link 29 of the chain 26 or 27. The links of the chain 29 are coupled to hinge pins which each include a guide roller 31. To either side of this guide roller 31 are link plates which receive the hinge pins 32 and couple them to the corresponding hinge pin of the next guide roller. The guide rollers 31 move between two guide rails 33, 34 which limit the sag of the chains 26, 27 in a sense perpendicular to the path of the chains 26, 27.

The transverse or liaison bars 28 are secured at their upper ends for example by an L-shaped element, on the lower plate 35 of a link 29 of the upper chain 26 and, at their lower extremity in the same fashion, on the upper plate 36 of a link 29 of the lower chain 27. The link plates 35, 36 are in register since the tooth roots 25 of the toothed wheels 23, 24 in which the guide rollers 31 engage are in register with one another. The spacing between the liaison bars 28 is a function of the size of the carriers 21 which are associated with the liaison bars 28.

The liaison bar 28 comprises at its lower part a base 37 of which a surface 38 extends outwardly and downwardly. The inclined surface 38 is provided, near its lower extremity, with a shock absorber 39 cooperating with the carrier 21. The shock absorber 39 is preferably a hydraulic shock absorber, for example, of the kind for absorbing shock in door closure. Rebound of the carrier 21 is thus avoided when the carrier is hinged. The shock absorber 39 is hinged in known fashion on the base 37 and pivots outwardly and downwardly when it is engaged by the carrier. Once freed, it reassumes its shock absorbing position under the action of a spring incorporated in the shock absorber.

Each carrier 21 is formed by two plates of sheet material 40, 41 welded together to form, in transverse section through the axis of the liaison bar 28, a right angle. In the zone of junction between plates 40, 41 of which one is generally vertical and the other horizontal, the zone being positioned adjacent the base 11, the carrier is articulated about a horizontal axis on a pin $21a$ mounted on a support bar $22b$ fast with the liaison bar 28 and with the base stop 37. At its upper part, the upper vertical plate 40 comprises a carrier roller 42 which is guided between two rails $43a$, $43b$ located at the same level as the guide rails 33, 34 of the upper chain 26 and to the outer side of these latter rails. The inner guide rail $43a$ is preferably formed by the other face of the outer guide rail 34 of the upper chain 26.

Each liaison bar 28 comprises, near its lower extremity and on the side toward the interior of the conveyor, a bearing block 44 for a support roller 45 whose axis is perpendicular to the path of the chains 26, 27 and to the bar 28 and which bears on the upper horizontal wing of the interior guide rail 33 of the lower chain 27.

When the carrier roller 42 is engaged between its guide rails $43a$, $43b$, the carrier 21 is in the loading or transport attitude, in which attitude the plate 40 is vertical and the receiving plate 41 is horizontal.

In the region of or close to each receiving station $10_1$ ...... $10_n$, the outer guide rail $43b$ for the carrier roller 42 has an opening 47 through which the roller 42 can pass outwardly and allow the carrier 21 to hinge under gravity so that the article 46 on the carrier 21 is discharged to the corresponding receiving station (see FIGS. 1, 4 and 5).

The opening 47 is, in general, near the lateral side upstream of the receiving station $10_1$ .... $10_n$. This opening 47 is sufficiently large relative to the carrier roller 42 to allow its escape outside the outer guide rail $43b$, having regard to the speed of travel of the conveyors 6, 7 and of the inertia of the carrier 21, and is positioned relative to the corresponding receiving station so that the falling parcel from the tipped carrier is centered relative to the selected receiving station.

However, the receiving stations $10_1 \ldots 10_n$ are sufficiently large to take account, themselves, of the response time of the carrier when it is tipped. In any case, the size of the receiving stations $10_1 \ldots 10_n$, the dimension taken in the direction of travel of the conveyors, is always greater than that of the carriers 21.

The opening 47 of the outer guide rail 43b of the carrier roller 42 is usually closed by a movable shutter 48 fast with the free end of a lever 49 pivoted at its other end on a horizontal shaft 50 fast with the base 11; the shutter 48 or the lever 49 is hinged on the movable core 51 of an electro-magnet 52 mounted in the upper part of the base 11.

As can best be seen from FIGS. 4 and 5, between each conveyor 6, 7 and the receiving stations $10_1 \ldots 10_n$ is an intermediate receiver 53, 54. These intermediate receivers 53, 54 are superposed and have, for example, the form of a chute inclined downwardly in the direction of the corresponding receiving station.

The extremity of the intermediate receiver 53, 54 directed toward the conveyors 6, 7 is located so that it is slightly overlapped by the free edge of the receiver plate 41 of the carrier 42 and so that it is in alignment with this receiver plate 41 and slightly overlapped by it when the carrier is in the tipped position (the position shown in broken lines in FIGS. 3 and 4).

At the lower extremity, the upper intermediate receivers 53 each comprise a discharge shutter 55 which is curved upwardly and is pivoted about a pin 58 fast with the sides 56, 57 of the corresponding intermediate receiver and situated above the lower extremity of the upper intermediate receiver 53. On the pivot axis of this discharge shutter 55 is also pivoted an intermediate stop shutter 55a which can be positioned against a part of the upper intermediate receiver 53 so as to prevent discharge of articles falling in the corresponding intermediate receiver 53 during the opening of the discharge shutter 55. As can be seen in FIG. 4 the stop shutter 55a is placed in its stop position, against the central part of the upper intermediate receiver 53. The conveyor 6 and the intermediate receivers 53 for small articles are placed above the conveyor 7 and the intermediate receivers 54 for large articles.

Below the lower extremity of the intermediate receivers 53, 54 are the receiving stations $10_1 \ldots 10_n$. Each receiving station comprises, according to a preferred embodiment, a receiver 59 open upwards at its upper extremity opposite the lower extremity of the intermediate receivers 53, 54. The receiver 59 comprises, at its lower extremity, a stop plate 60 and is hinged about a horizontal shaft 61 located near the lower extremity of the lower intermediate receiver 54 in sides 62, 63 which extend toward the exterior above the lower extremity of the central chute of the said intermediate receiver 54. At its upper extremity, the receiver 59 comprises a securing bracket 64 for the free end of a sack 65. The receiver 59 has a planar wall 66 which can be aligned with the lower part of the central chute of the lower intermediate receiver 54. This, like the upper intermediate receiver 53, comprises a pivotable stop 67. The pivotable stop 67 of the lower intermediate receiver 54 is formed by a shield fast with the exterior and rear of the receiver 59, the side away from sack 65. The radius of curvature of shield 67 has its centre on the horizontal axis 61. The intermediate stop shutter 55a, articulated on the sides 56, 57 through the intermediary of a pin 58, follows the pivotal movement of the receptacle 59 by virtue of link means 68 fast at its ends with the receiver 59 and the stop 55a so that the stop shutter 55a is applied to the central part of the upper intermediate receiver 53 when the receiver 59 occupies its vertical position in which it can be loaded by the intermediate receiver 53 and in which the stop 67 closes the exit of the lower intermediate receiver 54 (see FIG. 4).

The tipping of the different receivers 59 is effected either manually, mechanically, pneumatically, hydraulically, by any suitable device which can for example be remote controlled.

The shaft 12 located in the base 11 is driven continuously by reduction gear 69.

In FIGS. 6 and 7 has been shown another embodiment of receiving station $10_1$ to $10_n$. In these FIGS. 6 and 7 have only been shown carriers 21 of superposed conveyors 6 and 7, the base 11 and the driving mechanism being identical to those shown in the other figures. The intermediate receivers 53, 54 are likewise superposed and carried on a support frame 70 such as in the previous embodiment. The intermediate receivers 53, 54 are subdivided longitudinally into at least two parts 55a, 55b and 54a, 54b. The upper part 53a, situated nearest the upper conveyor 6, slightly overlaps the rear edge of the lower part 53b of the upper intermediate receiver 53 and is displaced upwards relative to the latter. This prevents alignment of articles or parcels one behind another in the intermediate upper receiver 53 and ensures, on the contrary, riding of articles discharged into the intermediate receiver over one another and their superpositioning. The discharge shutter 55 is, in this embodiment, formed by a planar plate located so that in the closed position of the intermediate receiver 53, it is parallel to and slightly displaced downwardly relative to the lower part 53b of the intermediate receiver 53. Thus the lower part 53b forms for the plate or discharge shutter 55 a form of springboard as also does the upper part 53a for the lower part 53b. The sides 56, 57 extend here from the rear region of the upper part 53a to just before the downstream extremity of the plate 55. These sides 56, 57 extend downward and outward of the intermediate receiver 53 and from the discharge plate 55 and are coupled at their lower extremity by a cross member 71. The discharge plate 55 is fast, on its inner face, with a pivot or tip shaft 58 set in bearings provided in the sides 56, 57. This shaft 58 is for example, welded to the central transverse region of the discharge plate 55 between the cross member 71 and the lower extremity of the lower part 53b of the intermediate receiver 53. On a lateral extremity of the shaft 58 is, on the outside of the intermediate receiver 53, a toothed wheel 72, coupled by a chain 73 to another toothed wheel 74 keyed on the pivot shaft 61 of the receiver 59. On the rear extremity of the discharge plate 55, that is to say the extremity nearest the upper conveyor 6, is secured an intermediate stop shutter 55a, formed by a cylindrical section whose axis coincides with the axis of the pivot shaft 58. The largest part of the cylindrical section 55a extends downwards below the discharge plate 55, while the other part extends upwards to the level of the lower extremity of the lower part 53b of the intermediate receiver 53 when the discharge plate 55 occupies its closed position is shown in full line in FIG. 6. The peripheral length of the cylindrical section 55a is such that it can form a stop to the full height of the sides 56, 57 as shown in chain dot line in FIG. 6, when the discharge plate 55 is inclined nearly vertically. In this position, the parcels placed on the discharge plate 55 are dispatched into the receiver 59 while parcels falling meanwhile in the upper intermediate receiver 53 are temporarily held by the shutter stop 55a.

The lower intermediate receiver 54 comprises a movable upper part 54a which is mounted on the support frame 70 at its innermost extremity by a pivot pin 75 set, preferably, at least approximately in the prolongation of the plane of the lower fixed part 54b. The movable part 54a is formed by a piece shaped as a wedge increasing in size toward the exterior of the apparatus so as to form a sector which, at its periphery, is defined by a cylindrical surface whose axis coincides with the axis of the pin 75. In the raised position shown in chain dot line on FIG. 6, the movable part 54a forms a type of spring board for parcels falling into the lower intermediate receiver 54 and causes these parcels to lie on top of one another in the lower part 54b of the intermediate receiver 54, when the exit of the latter is closed. Raising the movable part 54a is effected by a transverse spindle 76 guided in horizontal grooves 77 provided in guide members 78 secured to the frame 70, and by a lever 79 pivoted on the transverse spindle 76 and on a control lever 80 keyed on the pivot pin 61 of the receiver 59. The action of the lever 79 on the lever 80 is eccentric relative to the hinge axis 61.

The lower fixed part 54b of the intermediate receiver 54 is planar and limited laterally by sides 62, 63 which extend from the lower part to the inner extremity of the movable upper part 54a.

The receiver 59 is of Z form. In normal position, shown in full lines in FIG. 6, the upper part 59a is in alignment with the lower part 54b of the intermediate receiver 54, the medium part 59b is nearly vertical and the lower part 59c is horizontal. This arrangement ensures that the sack, not shown in FIGS. 6 and 7, and fixed on the receiver 59 hangs freely downwards at its lower part and allows satisfactory packing of parcels as they fall into the sack.

The upper part 59a has sides 81, 82 which extend outwardly so as to lie over the lower part 59c. Each of these sides 81, 82 is keyed on the pivot shaft 61 or more particularly on half-shaft 61a, 61b, since the zone between the sides 81, 82 must remain clear so as not to interfere with discharge of parcels. On the outside of the sides 81, 82 the half-shafts 61a and 61b are set in bearings provided in vertical support plates 83, 84 secured to the frame 70. On one of the half-shafts 61a, 61b, for example shaft 61b, are keyed toothed wheel 74 coupled by chain 73 to the toothed wheel 72 of the discharge plate 55 as well as the actuating lever 80 to which is articulated above the half-shaft 61b, the end of lever 79.

The upper extremity of the sides 81, 82, the extremity situated opposite the lower part 54b of the intermediate receiver 54, is cut on the arc of a circle 81a centred on the axis of the pivot shaft 61 or half-shafts 61a, 61b. In analogous fashion, the lower extremity of the sides 62, 63 of the lower part 54b of the intermediate receiver 54 is cut away on an arc of a circle 62a which is concentric with the circle 81a. The radius of the circle 62a is slightly greater than that of the circle 81a.

On the rear or lower face of the upper and medium parts 59a and 59b of the receiver 59 is mounted a cylindrical plate 67 which forms a shield and serves as a stop for parcels falling in the intermediate receiver 54 when the receiver 59 is raised and occupies the position shown in broken line in FIG. 6. In this position the receiver 59 can receive parcels falling from the intermediate upper receiver 53. The curvature of the cylindrical plate 67 is determined by the radius of the circle 81a of the sides 81, 82 of the receiver 59. As a result, the cylindrical plate 67 is positioned on the same circle as the arc 81a.

The bottom of the receiver 59, that is to say the lower part 59c of the latter, is provided with a layer of shock absorbing material 59d, for example foamed rubber. Likewise it is possible to provide the medium part 59b with such a layer 59d.

Near the upper extremity of the upper part 59a is, in the internal faces of the sides 81, 82 and in the face of the bottom or chute of the part 59a, a groove 85 of which the plane is perpendicular to the face of the bottom or chute 59a and to the sides 81, 82. In the raised position of the receiver 59, this groove 85 is in a horizontal plane and assists introduction of the mouth of a sack 65 (see more particularly FIGS. 8 and 9). This groove 85 can equally be provided in a piece in the form of a U 86, opening upwardly and away from the bottom of the part 59a and fixed to the interior and near the upper extremity of the upper part 59a of the receiver 59. This piece 86 can equally replace the fixing bracket 64 of the embodiment of FIGS. 4 and 5.

The extremity corresponding to the opening of the sack 65 is cut away on the inside or the outside of the sack and fixed thereto are two metallic or plastic elements of U-form 87, 88 received in the extremity. The elements 87, 88 at their free ends are coupled by buckles 89. 90 engaging one another so as to form a hinge. Thus, the opening of the sack 65, in the open condition, is in a single plane and can be introduced into the groove 85 so that the sack 65 is held in the receiver 59. On the other hand, when the sack is full, it can be removed without difficulty and rapidly from the groove 85 and can be closed by hinging elements 87, 88 toward one another about their hinge axis so that the elements 87, 88 are parallel and juxtaposed.

In normal operation of the apparatus, the receiver 59, as well as all the other parts of each receiving station, occupy the position indicated in full lines in FIGS. 6 and 7. The parcels falling on the intermediate receiver 54 enter the sack 65 without meeting any obstacles, while the articles falling on the intermediate upper receiver 53 are arrested on the discharge plate 55 by the cross member 71. When the lever 80 is pivoted to the position shown in broken line in FIG. 6, the receiver 59 is pivoted clockwise about its axis 61. In this position (shown in broken lines in FIG. 6) the cylindrical plate or shield 67 closes the lower extremity of the lower intermediate receiver 54 so that parcels falling on the latter during this time cannot leave the lower intermediate receiver 54. During the hinging of the receiver 59, the movable part 54a is hinged upwards about its pivot axis 75 counterclockwise so as to form a springboard to cause parcels to lie upon one another on the lower part 54b of the intermediate receiver 54. When the receiver 59 is pivoted, so also is the discharge plate 55 about its axis 58 so that parcels arriving on that plate are discharged into the sack 55 and the cylindrical section 55a forms a stop to close the entry to the upper intermediate receiver 53.

It will be well understood that various modifications may be made to the embodiments described without departing from the scope of the invention.

We claim:

1. Apparatus for directing articles to a plurality of receiving stations, the apparatus comprising a loading station, an endless conveyor passing in front of the loading station, as well as in front of the receiving stations, and provided with a plurality of carriers capable of being loaded with articles to be conveyed to the different receiving stations, and an indexing station associated with the different carriers and comprising a control memory to initiate unloading of a carrier at the region of a receiving station which has been associated with it at the instant of its being indexed, characterised in that the apparatus comprises at least one other endless conveyor superposed above the first and provided with a plurality of carriers for receiving objects of a size group different from the size group of the objects conveyed by the first conveyor, a loading station, an indexing station and a control memory all associated with this other conveyor and an intermediate receiver located between each receiving station and the first conveyor and the other conveyor.

2. Apparatus according to claim 1, characterised in that it comprises upstream of the loading stations a common pre-selection station for separating articles coming from a store into at least two groups of articles classified as a function of their size or weight, the exits of the preselection station being connected, by conveyors, to one of the loading stations, so that the exit for articles of large size will direct them to the loading station associated with the lower conveyor.

3. Apparatus according to claim 2, characterised in that the preselection station comprises a hinged trap which will open under predetermined load and which is interposed in the path of articles between the common entry and the two exits of the preselection station.

4. Apparatus according to claim 1, characterised in that the loading stations and indexing stations are grouped together near one of the ends of the conveyors.

5. Apparatus according to claim 1 characterised in that said other endless conveyor and its corresponding loading and indexing stations are all associated with the articles of small size and said first conveyor and its analogous stations are associated with the articles of large size.

6. Apparatus according to claim 1, characterised in that each carrier comprises a plate which is generally horizontal and hinged at its end located adjacent a base on a horizontal shaft fast with a vertical liaison bar between the two superposed endless chains of a conveyor, and in that the liaison bar comprises, at its lower part, a base which projects outwardly of the apparatus and has an outwardly and downwardly inclined surface provided, at its lower extremity, with a shock absorber cooperating with the corresponding carrier.

7. Apparatus according to claim 1, characterised in that the intermediate receivers associated with the upper conveyor and located above the corresponding receiver each comprises a discharge shutter or plate hinged about a pivot member mounted in bearings in the sides of the intermediate receiver, the shutter or plate being operable to open and close the exit of the upper intermediate receiver.

8. Apparatus according to claim 7, characterised in that on the pivot member of the shutter or plate is articulated an intermediate stop shutter movable to lie against a part of the upper intermediate receiver to prevent exit of articles falling in the said intermediate receiver, the stop shutter being, preferably, fast with the discharge shutter or plate.

9. Apparatus according to claim 1, characterised in that each receiving station comprises, below the lower extremity of the intermediate receiver associated with said first conveyor, a receiver having a pivot member, rotatably fast with the receiver, and mechanically coupled at least to an intermediate stop shutter of the upper intermediate receiver associated with said first conveyor, so that this shutter closes the exit of at least the upper part of the corresponding intermediate receiver associated with said first conveyor when the receiver is in a position to receive articles leaving the upper intermediate receiver associated with said first conveyor.

10. Apparatus according to claim 7, characterised in that the lower extremities of the sides of the upper intermediate receiver extend toward the outer lower extremity of the central chute of the intermediate receiver, in that the extremities of the sides are coupled by a cross-member and in that in the opening defined by the lower extremity of the chute, the lower free edges of the sides and the lower edge of the cross-member is located the discharge plate which by pivotal movement, frees that opening and which in the closed position lies in a plane substantially parallel to that of the central chute and preferably displaced downwards relative thereto.

11. Apparatus according to claim 7, characterised in that the discharge shutter or plate is mechanically coupled to the receiver so that the discharge shutter or plate permits exit from the upper intermediate receiver when the receiver is in the position which allows it to receive articles leaving the upper intermediate receiver.

12. Apparatus according to claim 1, characterised in that a pivotal stop is associated with the receiver and can close the lower extremity of the intermediate receiver associated with said first or lower conveyor when the receiver occupies the position in which it can receive articles leaving the intermediate receiver associated with said other or upper conveyor, this pivotal stop being preferably formed by a cylindrical shield fast with the rear of the receiver.

13. Apparatus according to claim 1, characterised in that at least one of the intermediate receivers associated with a receiving station and with said first or said other of the conveyors, is subdivided into two parts one nearest the corresponding conveyor being above the other part and the lower extremity of that upper part overlapping the upper extremity of the lower part which lower part is located adjacent the receiver of the corresponding receiving station, and the upper part is displaced upwardly at its lower part so as to form a springboard for articles discharged on the upper part of the intermediate receiver.

14. Apparatus according to claim 13, characterised in that the upper part of the intermediate receiver associated with said first conveyor and called lower intermediate receiver is movable relative to the fixed lower part of said lower intermediate receiver so that it is movable between two positions in one of which it is in alignment with the lower part and in the other of which it forms a springboard displaced upwardly relative to the lower part and in that said movable upper part of the lower intermediate receiver is linked to the livot member of said receiver by a mechanical coupling operable so that the movable upper part occupies its springboard position when said receiver is located so as to receive articles leaving the intermediate receiver associated with said other conveyor, the rear end of the movable upper part, that end nearest said first conveyor, being preferably mounted on a hinge member whose axis is substantially in the plane of the lower fixed part of the intermediate receiver associated with said first conveyor.

15. Apparatus according to claim 9, characterised in that the receiver comprises three parts which together present a Z-shaped section, the parts being located relative to one another so that in a normal attitude of the receiver, the attitude in which articles falling on the lower intermediate receiver associated with the first or lower conveyor are automatically discharged into the receiver, the upper part of the receiver is aligned with the lower part of the said intermediate receiver, the medium part is approximately vertical and the lower part is substantially horizontal.

16. Apparatus according to claim 15, characterised in that the upper part of the receiver is provided with a groove defining a plane perpendicular to the base and sides of the upper part of the receiver and formed either in the base and sides of the receiver or in a member of U-shape open away from the base of the receiver and fast with the receiver, this groove being adapted to receive the open end of a sack and to hold the sack onto the receiver.

* * * * *